United States Patent

Miura et al.

(10) Patent No.: US 12,249,711 B2
(45) Date of Patent: Mar. 11, 2025

(54) POSITIVE-ELECTRODE ACTIVE MATERIAL FOR LITHIUM-ION SECONDARY BATTERY AND LITHIUM-ION SECONDARY BATTERY

(71) Applicant: SUMITOMO METAL MINING CO., LTD., Tokyo (JP)

(72) Inventors: Ayumi Miura, Ehime (JP); Hiroyuki Fujimoto, Osaka (JP); Masanori Maekawa, Osaka (JP); Kaoru Nagata, Osaka (JP)

(73) Assignees: SUMITOMO METAL MINING CO., LTD., Tokyo (JP); Panasonic Energy Co., Ltd., Osaka (JP)

( * ) Notice: Subject to any disclaimer, the term of this patent is extended or adjusted under 35 U.S.C. 154(b) by 467 days.

(21) Appl. No.: 17/753,751

(22) PCT Filed: Sep. 16, 2020

(86) PCT No.: PCT/JP2020/035157
§ 371 (c)(1),
(2) Date: Mar. 14, 2022

(87) PCT Pub. No.: WO2021/054381
PCT Pub. Date: Mar. 25, 2021

(65) Prior Publication Data
US 2022/0376241 A1 Nov. 24, 2022

(30) Foreign Application Priority Data
Sep. 17, 2019 (JP) .................. 2019-168510

(51) Int. Cl.
*H01M 4/525* (2010.01)
*H01M 4/04* (2006.01)
*H01M 4/505* (2010.01)
*H01M 4/02* (2006.01)

(52) U.S. Cl.
CPC .......... *H01M 4/525* (2013.01); *H01M 4/0471* (2013.01); *H01M 4/505* (2013.01); *H01M 2004/021* (2013.01); *H01M 2004/028* (2013.01)

(58) Field of Classification Search
CPC ....... H01M 10/0525; H01M 2004/021; H01M 2004/028; H01M 4/0471; H01M 4/505; H01M 4/525
See application file for complete search history.

(56) References Cited

U.S. PATENT DOCUMENTS

| | | |
|---|---|---|
| 2009/0104530 A1 | 4/2009 | Shizuka et al. |
| 2010/0117031 A1 | 5/2010 | Akagi et al. |

(Continued)

FOREIGN PATENT DOCUMENTS

| | | |
|---|---|---|
| EP | 3694028 | 8/2020 |
| JP | 2000-323142 | 11/2000 |
| JP | 2002-203552 | 7/2002 |

(Continued)

OTHER PUBLICATIONS

International Search Report mailed on Nov. 2, 2020 with respect to PCT/JP2020/035157.

*Primary Examiner* — Victoria H Lynch
(74) *Attorney, Agent, or Firm* — IPUSA, PLLC

(57) ABSTRACT

A positive-electrode active material for a lithium-ion secondary battery, wherein an average pore size of the positive-electrode active material is 0.2 μm to 1.0 μm when a pore size is measured in a range of 0.0036 μm to 400 μm.

2 Claims, 1 Drawing Sheet

(56) References Cited

U.S. PATENT DOCUMENTS

2017/0149048 A1  5/2017  Takahata
2018/0261399 A1  9/2018  Umetsu et al.

FOREIGN PATENT DOCUMENTS

| JP | 2008-282803 | 11/2008 |
| JP | 2015-069822 | 4/2015 |
| JP | 2015-201442 | 11/2015 |
| JP | 2018-029200 | 2/2018 |
| WO | 2019/069402 | 4/2019 |

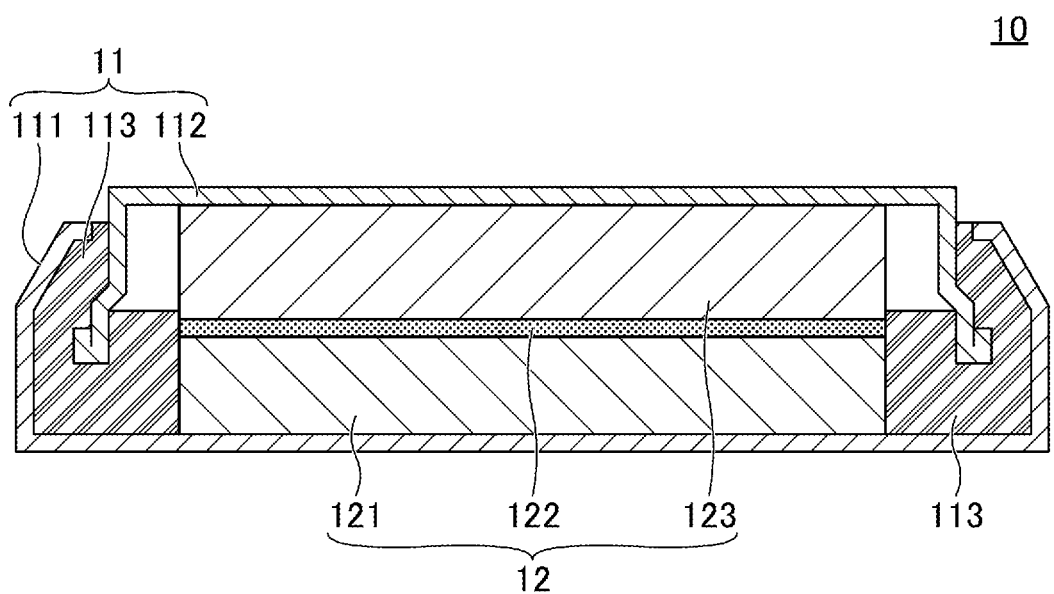

POSITIVE-ELECTRODE ACTIVE MATERIAL FOR LITHIUM-ION SECONDARY BATTERY AND LITHIUM-ION SECONDARY BATTERY

TECHNICAL FIELD

The present invention relates to a positive-electrode active material for lithium-ion secondary battery and relates to a lithium-ion secondary battery.

BACKGROUND ART

In recent years, the spread of mobile electronic devices, such as cellular phones and notebook computers, has brought strong demand for development of small and light nonaqueous electrolyte secondary batteries having high energy density. Development has also been strongly desired for secondary batteries with excellent output and charge and discharge cycle characteristics used as batteries for electric vehicles including hybrid vehicles.

As secondary batteries that satisfy such demands, lithium-ion secondary batteries have been available. A lithium-ion secondary battery is constituted with a positive electrode, a negative electrode, an electrolyte solution, and the like; as a positive-electrode active material and a negative-electrode active material, materials capable of de-intercalating and intercalating lithium are used.

Research and development have been vigorously conducted in these days for lithium-ion secondary batteries. Among these, practical use of lithium-ion secondary batteries that use lithium composite oxide having a layered or spinel structure as a positive-electrode material is progressing, because a voltage as high as 4 V can be obtained, and hence, a high energy density can be realized.

As a positive-electrode material for a lithium-ion secondary battery, lithium composite oxide such as lithium-cobalt composite oxide ($LiCoO_2$), lithium-nickel composite oxide ($LiNiO_2$), lithium-nickel-cobalt-manganese composite oxide ($LiNi_{1/3}Co_{1/3}Mn_{1/3}O_2$), lithium-manganese composite oxide ($LiMn_2O_4$) in which manganese is used, lithium-nickel-manganese composite oxide ($LiNi_{0.5}Mn_{0.5}O_2$), lithium rich-nickel-cobalt-manganese composite oxide ($Li_2MnO_3$—$LiNi_xMn_yCo_zO_2$), and the like are proposed.

In the future, especially for applications such as electric vehicles, further increases in the capacity of the positive-electrode material are required in order to extend cruising range.

As an approach for increasing the capacity of the positive-electrode material, controlling structure of the positive-electrode material has been studied. For example, Patent Literature 1 discloses a nonaqueous electrolyte battery in which the pore volume of the positive-electrode active material is in the range of 0.001 cc/g to 0.01 cc/g and which has both a high discharge capacity and excellent cycle characteristics.

CITATION LIST

Patent Literature

[PTL 1]
Japanese Laid-Open Patent Publication No. 2002-203552

SUMMARY OF INVENTION

Technical Problem

When a lithium-ion secondary battery is charged and discharged, lithium ions move between the positive-electrode active material and the electrolyte. Therefore, in order to improve battery characteristics, for example, to increase the output of lithium-ion secondary batteries, it is effective to increase the contact area between the positive-electrode active material and the electrolyte as much as possible and to use particles of a porous positive-electrode active material having a uniform pore on the surface.

However, when the positive-electrode active material of Patent Literature 1 is used, the capacity of the obtained nonaqueous electrolyte battery is not sufficient. In order to further increase the capacity of lithium-ion secondary batteries, there is a need for a positive-electrode active material that can further increase the capacity of lithium-ion secondary batteries.

Accordingly, in view of the above-described problems in the related art, an object of the present invention is to provide a positive-electrode active material for a lithium-ion secondary battery that can improve battery characteristics when used in a lithium-ion secondary battery.

Solution to Problem

In order to solve the above problem, one aspect of the present invention is: a positive-electrode active material for a lithium-ion secondary battery, wherein an average pore size of the positive-electrode active material is 0.2 μm to 1.0 μm when a pore size is measured in a range of 0.0036 μm to 400 μm.

Advantageous Effects of Invention

According to one aspect of the present invention, a positive-electrode active material for a lithium-ion secondary battery that can improve battery characteristics when used in a lithium-ion secondary battery, can be provided.

BRIEF DESCRIPTION OF THE DRAWINGS

FIG. 1 is a diagram illustrating a cross-sectional configuration of a coin battery produced according to Example 1;

DESCRIPTION OF EMBODIMENTS

In the following, embodiments of the present invention will be described in detail. The present invention is not limited to the following embodiments, and various modifications and substitutions can be made to the following embodiments without departing from the scope of the present invention. As used herein, "X to Y" indicating a numerical range is meant to include a lower limit and an upper limit that are given as numerical values before and after "to", unless otherwise noted.

(Positive-Electrode Active Material for Lithium-Ion Secondary Battery)

A positive-electrode active material for lithium-ion secondary battery (hereinafter, also referred to as "positive-electrode active material") according to the present embodiment may include particles of lithium composite oxide.

The positive-electrode active material according to the present embodiment has an average pore size of 0.2 μm to 1.0 μm, preferably 0.2 μm to 0.75 μm, more preferably 0.25 μm to 0.65 μm, and even more preferably 0.3 μm to 0.55 μm when the pore size is measured in the range of 0.0036 μm to 400 μm.

In the present embodiment, the pore size may be measured using a fully automatic pore size analyzer (Mercury porosimeter (PoreMaster (trademark) 60-GT, manufactured by Quantachrome Corporation)). The average pore size is the average pore diameter of a plurality of pores, and the average of the diameter of pores can be used.

When a positive-electrode active material is used in a lithium-ion secondary battery, because the capacity of the positive-electrode active material is affected by the contact area between the positive-electrode active material and the electrolyte, the capacity of the lithium-ion secondary battery typically tends to increase as the specific surface area of the positive-electrode active material increases. However, even when the specific surface area of the positive-electrode active material is large, the capacity of the lithium-ion secondary battery may not increase but decrease. This is thought to be due to the following. The specific surface area of the positive-electrode active material is measured using a gas adsorption method of adsorbing gas in the pores, and the specific surface area of the positive-electrode active material is measured including the surface of the pores. However, when the pore size is too small, the electrolyte solution cannot enter the pore due to its surface tension. Therefore, the gas adsorption method is not effectively used for measuring the specific surface area of the positive-electrode active material.

The positive-electrode active material according to the present embodiment has an average pore size of 0.2 μm to 1.0 μm when the pore size is measured in the range of 0.0036 μm to 400 μm. When the average pore size measured in the range of 0.0036 μm to 400 μm is 0.2 μm or more, the electrolyte solution easily penetrates into the pore. Accordingly, the amount of pores in which the electrolyte solution does not enter can be reduced, and the contact area with the electrolyte solution can be increased. Therefore, when the positive-electrode active material is used for the lithium-ion secondary battery, the charge and discharge capacity of the lithium-ion secondary battery can be improved. When the average pore size measured in the range of 0.0036 μm to 400 μm is 1.0 μm or less, the strength of the positive-electrode active material can be maintained. Accordingly, by preventing the positive-electrode active material from being deformed or the like, it is possible to reduce variation of the pore size and the like, and it is easy to maintain the pore size stably. Therefore, when the positive-electrode active material is used for the lithium-ion secondary battery, it is easy to reduce the decrease in the charge and discharge capacity of the lithium-ion secondary battery.

The positive-electrode active material according to the present embodiment has an average pore size of 0.2 μm to 1.0 μm when the pore size is measured in the range of 0.0036 μm to 400 μm. Accordingly, the positive-electrode active material according to the present embodiment has a plurality of uniform pores on the surface and inside of the particle. Therefore, when the positive-electrode active material according to the present embodiment is used as the positive electrode of the lithium-ion secondary battery, it is possible to improve the battery characteristics of the lithium-ion secondary battery such as charge capacity, discharge capacity, and charge and discharge efficiency.

In the present embodiment, as shown in the following formula (1) below, when the cumulative specific surface area measured in the range of the average pore size of 0.0036 μm to 0.5 μm is S2 and the cumulative specific surface area measured in the range of the average pore size of 0.0036 μm to 400 μm is S1, the ratio S2/S1 is set as a proportion of micropores. The positive-electrode active material according to the present embodiment has a proportion of micropores of preferably 70% to 92%, more preferably 80% to 90%, and even more preferably 83% to 88%. By setting the proportion of micropores to be 70% to 92%, the positive-electrode active material according to the present embodiment can be adjusted so that the cumulative specific surface area S2 is not too high relative to the cumulative specific surface area S1. Accordingly, it is possible to reduce pores that are not used effectively when measuring battery characteristics. Therefore, by using the positive-electrode active material according to the present embodiment as the positive electrode of the lithium-ion secondary battery, the battery characteristics of the lithium-ion secondary battery can be further improved. The cumulative specific surface area can be measured by, for example, a flow-type gas adsorption method specific surface area measurement device and the like.

$$\text{proportion of micropores (\%)} = \text{(cumulative specific surface area } S2 \text{ measured in the range of pore size of 0.0036 μm to 0.5 μm)/(cumulative specific surface area } S1 \text{ measured in the range of 0.0036 μm to 400 μm)} \times 100 \quad (1)$$

The composition of the lithium composite oxide is not limited, for example, lithium-nickel composite oxide is raised. The lithium-nickel composite oxide may contain, for example, lithium (Li), nickel (Ni), cobalt (Co), and an element (also referred to as an additive element) M (M) in an amount of substance ratio of Li:Ni:Co:M=1+a:1-x-y:x:y. It is preferable that a, x, and y in the above formula satisfy $-0.05 \leq a \leq 0.50$, $0 \leq x \leq 0.35$, and $0 \leq y \leq 0.35$, respectively. The element M may be at least one element selected from Mg, Ca, Al, Si, Fe, Cr, Mn, V, Mo, W, Nb, Ti, Zr, and Ta.

The lithium-nickel composite oxide may be represented, for example, by the general formula: $Li_{1+a}Ni_{1-x-y}Co_xM_yO_{2+\alpha}$. The description of a, x, and y in the above general formula is omitted here because it is described above. It is preferable that α satisfies $0 \leq \alpha \leq 0.10$, for example.

[Method of Manufacturing Positive-Electrode Active Material for Lithium-Ion Secondary Battery]

A method of manufacturing the positive-electrode active material according to the present embodiment will be described. The method of manufacturing the positive-electrode active material according to the present embodiment may include a crystallizing process, a mixing process, and a firing process. The method of manufacturing the positive-electrode active material according to the present embodiment may include an oxidizing roasting process between the crystallizing process and the mixing process, if necessary, and the oxide obtained in the oxidizing roasting process may be used in the mixing process.

(A) Crystallizing Process

Particles of nickel composite hydroxide including nickel and an additive element M (nickel composite hydroxide particles) are crystallized by crystallization method (crystallizing process).

The nickel composite hydroxide may be represented, for example, by the general formula: $Ni_{1-x-y}Co_xM_y(OH)_{2+\beta}$. In the above formula, it is preferable that x and y satisfy the above-described range. It is preferable that β satisfies $-0.2 \leq \beta \leq 0.2$, for example.

The specific procedure of the crystallizing process is not particularly limited. The crystallizing process may be performed, for example, by mixing a mixed aqueous solution containing nickel (Ni) and an additive element M with an alkaline aqueous solution to crystallize particles of nickel composite hydroxide. Specifically, the crystallizing process is preferably performed by the following procedure, for example. The mixed aqueous solution may further contain cobalt (Co).

First, water is put into a reaction vessel and controlled to a predetermined atmosphere and temperature. The atmosphere in the reaction vessel during the crystallizing process is not particularly limited. For example, the atmosphere may be an inert gas atmosphere such as a nitrogen atmosphere. In addition to the inert gas, a gas containing oxygen, such as air, can be supplied together to adjust the dissolved oxygen concentration of the solution in the reaction vessel. In addition to water, an alkaline aqueous solution, which will be described later, or a complexing agent, may be put into the reaction vessel to prepare an initial aqueous solution.

Then, a mixed aqueous solution containing at least nickel and the additive element M and an alkaline aqueous solution are added to the reaction vessel to prepare a reaction aqueous solution. The reaction aqueous solution is then stirred at a constant rate while controlling pH so that particles of nickel composite hydroxide can be co-precipitated and crystallized in the reaction vessel.

Instead of supplying the mixed aqueous solution containing nickel and the additive element M into the reaction vessel, a mixed aqueous solution containing part of metals and an aqueous solution containing the remaining metal may be supplied into the reaction vessel. Specifically, for example, a mixed aqueous solution containing nickel and an aqueous solution containing the additive element M may be supplied. Aqueous solutions of each metal may be prepared separately and the aqueous solutions containing each metal may be supplied into the reaction vessel.

The mixed aqueous solution containing nickel and the additive element M may be prepared by adding salts of each metal to water, which is a solvent. The types of the salts are not particularly limited. As a nickel salt, for example, one or more salts selected from sulfate, nitrate, and chloride may be used. When cobalt is included, as a cobalt salt, one or more salts selected from sulfate, nitrate, and chloride may be used. The types of the salts of each metal may be different, but it is preferable that the type of the salts is the same from the viewpoint of preventing contamination by impurities.

As a salt containing the additive element M, for example, one or more kinds selected from manganese sulfate, manganese chloride, titanium sulfate, tungsten oxide, molybdenum oxide, molybdenum sulfide, vanadium pentoxide, calcium chloride, aluminum sulfate, sodium aluminate, magnesium sulfate, magnesium chloride, magnesium carbonate, and the like may be used.

The alkaline aqueous solution may be prepared by adding an alkaline component to water as a solvent. The type of the alkaline component is not particularly limited. For example, one or more kinds selected from sodium hydroxide, potassium hydroxide, sodium carbonate, and the like may be used.

The composition of the metal element contained in the mixed aqueous solution and the composition of the metal element contained in the obtained nickel composite hydroxide are almost the same. Accordingly, it is preferable to adjust the composition of the metal element of the mixed aqueous solution to be the same as the composition of the metal element of the desired nickel composite hydroxide.

In the crystallizing process, in addition to the aqueous solution (the mixed aqueous solution) containing the metal component and the alkaline aqueous solution described above, any component may be added to the reaction aqueous solution.

For example, a complexing agent may be added to the reaction aqueous solution together with the alkaline aqueous solution.

The complexing agent is not particularly limited as long as it is capable of binding nickel ions or other metal ions in an aqueous solution and forming a complex. Examples of the complexing agent include an ammonium ion supplier. The ammonium ion supplier is not particularly limited. For example, as the ammonium ion supplier, one or more kinds selected from ammonia, ammonium sulfate, ammonium chloride, ammonium carbonate, ammonium fluoride, and the like may be used.

The temperature of the reaction aqueous solution in the crystallizing process is not particularly limited. For example, when the complexing agent is not used, it is preferable that the temperature of the mixed aqueous solution is in the range of more than 60° C. and 80° C. or less.

When the complexing agent is not used in the crystallizing process, by setting the temperature of the reaction aqueous solution to over 60° C., the solubility of Ni is increased. Therefore, it is possible to more certainly prevent a phenomenon in which the precipitate amount of Ni is deviated from the target composition and the co-precipitation does not occur.

By setting the temperature of the reaction aqueous solution to 80° C. or less in the crystallizing process, the evaporation amount of water can be reduced. Therefore, it is possible to prevent the slurry concentration from increasing. By preventing the slurry concentration from increasing, for example, it is possible to prevent unintended crystals such as sodium sulfate from precipitating in the reaction aqueous solution and increasing the impurity concentration.

In the crystallizing process, the pH of the mixed aqueous solution may be appropriately adjusted depending on the size of the particles of nickel composite hydroxide and the like. For example, when the complexing agent is not used, it is preferable that the pH of the reaction aqueous solution is in the range of 10 to 12. Unless otherwise specified, the pH of the reaction aqueous solution in the present specification means the pH at the temperature of the reaction aqueous solution.

In the crystallizing process, when the complexing agent is not used, by setting the pH of the reaction aqueous solution to 12 or less, it is possible to prevent the particles of nickel composite hydroxide from becoming fine particles and improve the filtration property. In addition, spherical particles can be obtained more reliably.

By setting the pH of the reaction aqueous solution to 10 or more, the rate of formation of the particles of nickel composite hydroxide can be accelerated, and it is possible to prevent some components such as Ni from remaining in the filtrate. Therefore, it is possible to obtain the particles of nickel composite hydroxide having the desired composition more reliably.

When an ammonium ion supplier, such as ammonia, is used as the complexing agent in the crystallizing process, the solubility of Ni is increased. Thus, the pH of the reaction aqueous solution in the crystallizing process is preferably 10 to 13.5. In this case, the temperature of the reaction aqueous solution is preferably 30° C. to 60° C.

When the ammonium ion supplier is not used as the complexing agent in the reaction aqueous solution, the ammonia concentration in the reaction aqueous solution in the reaction vessel is preferably maintained in a constant range of 3 g/l to 25 g/l.

By setting the ammonia concentration in the reaction aqueous solution to 3 g/l or more, the solubility of metal ions can be maintained particularly constant, so that primary particles of nickel composite hydroxide having a uniform shape and particle size can be formed. Therefore, it is possible to prevent the expansion of the particle size distribution of the obtained particles of the nickel composite hydroxide.

By setting the ammonia concentration in the reaction aqueous solution to 25 g/l or less, it is possible to prevent the solubility of metal ions from being excessively high, so that the amount of metal ions remaining in the reaction aqueous solution can be reduced. Therefore, it is possible to obtain the particles of nickel composite hydroxide having the desired composition more reliably.

When the ammonia concentration fluctuates, the solubility of the metal ions fluctuates, and hydroxide particles may not be formed uniformly. Therefore, it is preferable to maintain the ammonia concentration in a constant range. For example, during the crystallizing process, the ammonia concentration is preferably maintained at a desired concentration with the upper and lower ranges being within about 5 g/l.

After it has reached a steady state, the precipitate may be harvested, filtered, and washed in water to obtain nickel composite hydroxide particles. Alternatively, an aqueous solution containing the mixed aqueous solution and the alkaline aqueous solution, optionally containing the ammonium ion supplier, may be continuously supplied to the reaction vessel, overflowed from the reaction vessel, and the precipitate may be collected, filtered, and washed with water to obtain nickel composite hydroxide particles.

The additive element M may be added by coating the surface of the particles of the nickel composite hydroxide with the additive element M in order to optimize the crystallizing conditions and facilitate control of the composition ratio. In this case, the crystallizing process may further include a coating process of coating the surface of the obtained nickel composite hydroxide particles with the additive element M.

(Coating Process)

In the coating process, the method of coating the additive element M on the surface of the particles of the nickel composite hydroxide is not particularly limited, and various publicly-known methods may be used.

For example, particles of nickel composite hydroxide are dispersed in pure water to form a slurry. The slurry is mixed with a solution containing the additive element M in an amount corresponding to the desired coating amount. Acid is added dropwise to the mixed solution and the pH value is adjusted to obtain a predetermined pH. The acid is not particularly limited. As the acid, for example, one or more acids selected from sulfuric acid, hydrochloric acid, nitric acid, and the like is preferably used.

After adjusting the pH value of the mixed solution containing the slurry and the additive element M, the mixed solution is mixed for a predetermined time. Thereafter, the mixed solution may be filtered and dried to obtain a nickel composite hydroxide coated with the additive element M.

The method of coating the additive element M on the surface of the particles of the nickel composite hydroxide is not limited to the method described above. For example, a method of drying a solution containing a compound of the additive element M and a solution containing the particles of the nickel composite hydroxide by spray drying, or a method of impregnating the particles of the nickel composite hydroxide with a solution containing a compound of the additive element M may be used.

The particles of the nickel composite hydroxide provided to the coating process may be one in which a part of the additive element M is previously added or may be one in which the additive element M is not included. In a case where a part of the additive element M is previously added, for example, an aqueous solution containing the additive element M and the like may be added to the mixed aqueous solution when crystallizing, as described above. When the particles of the nickel composite hydroxide contain a part of the additive element M, it is preferable to adjust the amount of the additive element M to be added in the coating process so as to achieve the desired composition.

In the crystallizing process, a preliminary experiment may be performed in which the relationship is calculated between the crystallizing condition, such as pH or ammonia concentration of the reaction aqueous solution, and the size of the pore size of the positive-electrode active material according to the present embodiment, which is 0.0036 µm to 400 µm. Thus, the crystallizing condition in the crystallizing process may be prepared so that the pore size of the positive-electrode active material according to the present embodiment is 0.0036 µm to 400 µm. The crystallizing process is preferably performed by selecting the crystallizing condition so that the pore size of the positive-electrode active material according to the present embodiment is 0.0036 µm to 400 µm, based on the result of the preliminary experiment prepared in advance.

(B) Oxidizing Roasting Process

The nickel composite hydroxide obtained in the crystallizing process is fired (roasted by oxidation) in an oxygen-containing atmosphere, and then cooled to room temperature. Thus, a nickel composite oxide (a nickel compound roasted product) is obtained.

The nickel composite oxide may be represented, for example, by the general formula: $Ni_{1-x-y}Co_xM_yO_{1+\gamma}$. It is preferable that x and y in the above formula satisfy the above-described range. It is preferable that $\gamma$ is $-0.2 \leq \gamma \leq 0.2$, for example.

In the oxidizing roasting process, by firing the nickel composite hydroxide, moisture can be reduced, and at least a portion of the composite hydroxide can be converted to the nickel composite oxide, as described above. In the oxidizing roasting process, it is not necessary to completely convert the nickel composite hydroxide to the nickel composite oxide. The nickel composite oxide described herein may contain, for example, a nickel composite hydroxide or an intermediate thereof.

The roasting condition in the oxidizing roasting process is not particularly limited. It is preferable to fire in an oxygen-containing atmosphere, for example, in an air atmosphere at a temperature of 350° C. to 1000° C. for 5 hours to 24 hours.

By setting the firing temperature to 350° C. or more, it is possible to prevent the specific surface area of the obtained nickel composite oxide from being excessively large. Further, by setting the firing temperature to 1000° C. or less, it is possible to prevent the specific surface area of the nickel composite oxide from being excessively small.

By setting the firing time to 5 hours or more, the temperature in a firing vessel can be particularly uniform, and the reaction can proceed uniformly. Further, even when firing is performed for a period longer than 24 hours, no significant change is observed in the obtained nickel composite oxide. Therefore, it is preferable that the firing time is 24 hours or less from the viewpoint of energy efficiency.

The oxygen concentration in the oxygen-containing atmosphere during heat treatment is not particularly limited. It is preferable that the oxygen concentration is 20% by volume or more, for example. The upper limit of the oxygen concentration in the oxygen-containing atmosphere may be 100% by volume because the oxygen atmosphere may be used.

(C) Mixing Process

In the mixing process, a nickel composite compound and a lithium compound are mixed, and a raw material mixture (also referred to as "lithium composite oxide precursor") is obtained.

The nickel composite compound may be a nickel composite hydroxide obtained in the crystallizing process; a nickel composite compound roasted product obtained in the oxidizing roasting process; or a mixture thereof. Preferably, the nickel composite compound has a composition that corresponds to the desired lithium composite oxide.

For example, when a lithium composite oxide having the composition ratio described above is obtained, the nickel composite compound may contain nickel (Ni), cobalt (Co), and the element M (M) in an amount of substance ratio of Ni:Co:M=1-x-y:x:y. In the above formula, it is preferable that x and y satisfy the above-described range. As the element M, the same elements as described above may be used.

The mixing ratio of the lithium compound and the nickel composite compound is not particularly limited. The ratio (Li/Me) of the number of atoms of lithium (Li) to the number of atoms of metals other than lithium (Me) in the lithium composite oxide precursor is almost unchanged before and after the lithium composite oxide precursor is fired. Therefore, Li/Me in the lithium composite oxide precursor is approximately the same as Li/Me in the obtained lithium composite oxide. Thus, it is preferable that mixing is performed so that Li/Me in the lithium composite oxide precursor is the same as Li/Me in the desired lithium composite oxide. Li/Me means the ratio of the number of atoms of lithium to metals other than lithium contained in the lithium composite oxide precursor.

For example, it is preferable that mixing is performed so that Li/Me in the lithium composite oxide is 0.95 or more and 1.5 or less. In particular, it is more preferable that mixing is performed so that Li/Me in the lithium composite oxide precursor is 1.0 or more and 1.2 or less.

As the lithium compound, for example, one or more compounds selected from lithium carbonate, lithium hydroxide, and the like may be used. The lithium hydroxide may have hydration water and may be used with the hydration water, but it is preferable that the hydration water is reduced by roasting in advance. As the lithium hydroxide, it is particularly preferable to use anhydrous lithium hydroxide.

It is preferable that the particle size and the like of the nickel composite compound and the lithium compound is adjusted in advance so that a desired lithium composite oxide can be obtained after the firing process.

It is possible to use a commonly used mixer for mixing the nickel composite compound with the lithium compound. For example, one or more mixers selected from a shaker mixer, a Lödige mixer, a Julia Mixer, a V blender, and the like may be used. The mixing conditions in the mixing process are not particularly limited. It is preferable to select the conditions so that the ingredients used as raw materials are mixed sufficiently so that the shape of the particles and the like of materials such as the nickel composite oxide are not destroyed.

It is preferable that the lithium composite oxide precursor is sufficiently mixed in the mixing process before being provided to the firing process. When mixing is insufficient, problems such as variations in Li/Me among the particles and insufficient battery characteristics may occur.

It is preferable that the nickel composite compound and the lithium compound are weighed and mixed so that the lithium composite oxide precursor after mixing contains lithium (Li), nickel (Ni), cobalt (Co), and the additive element M (M) in an amount of substance ratio of Li:Ni:Co:Zr:M=1+a:1-x-y:x:y. The preferred ranges of a, x, and y in the formula may be the same as described above, and hence the description is omitted here.

The content ratio of each metal is almost unchanged before and after the firing process. Thus, it is preferable that mixing is performed so that the content ratio of each metal in the lithium composite oxide precursor is the same as the desired content ratio of each metal of the positive-electrode active material obtained by the method of manufacturing the positive-electrode active material according to the present embodiment.

(D) Firing Process

The lithium composite oxide precursor obtained in the mixing process is fired at a temperature of 600° C. to 1050° C. under an oxygen-containing atmosphere having an oxygen concentration of 80% by volume to 97% by volume (firing process). Accordingly, the positive-electrode active material according to the present embodiment, which is a particle-like lithium composite oxide, can be obtained.

The amount of the lithium composite oxide precursor to be filled in the firing vessel is not particularly limited. The amount is appropriately adjusted according to the size and the like of the firing vessel.

When the lithium composite oxide precursor is filled in the firing vessel, the shape of the lithium composite oxide precursor is not particularly limited. The shape and the like of the lithium composite oxide precursor may be selected so that the precursor can be uniformly heated in the firing process.

The firing temperature for firing the lithium composite oxide precursor is not particularly limited. The firing temperature is appropriately set according to the composition of the lithium composite oxide precursor.

By setting the firing temperature to 600° C. or more, diffusion of the lithium component into the metal composite compound such as the nickel composite oxide can be sufficiently promoted, and the characteristics of the obtained lithium composite oxide can be made particularly uniform. Accordingly, when the obtained lithium composite oxide is used as the positive-electrode active material, the battery characteristics can be particularly improved. In addition, because the reaction can proceed sufficiently, residual of excess lithium and unreacted particles can be reduced.

By setting the firing temperature to 1050° C. or less, it is possible to prevent the progress of sintering between the particles of the lithium composite oxide produced. In addition, by setting the firing temperature to 1050° C. or less, it is possible to prevent occurrence of abnormal grain growth and prevent coarsening of the particles of the obtained lithium composite oxide.

In the process of raising the temperature to the heat treatment temperature, the temperature may be preferably held near the melting point of the lithium compound for about 1 hour to 5 hours so that the reaction can be performed more uniformly.

Regarding the firing time in the firing process, the time for maintaining at a predetermined temperature, that is, the time for maintaining at the above-described firing temperature, is not particularly limited, and is preferably 2 hours or more, and more preferably 3 hours or more. By setting the time for maintaining at the firing temperature to 2 hours or more, formation of lithium composite oxide can be sufficiently promoted and residual of unreacted material can be more reliably reduced.

The upper limit of the time for maintaining at the firing temperature is not particularly limited. The time for maintaining at the firing temperature is preferably 24 hours or less in view of productivity and the like.

The atmosphere during firing is not particularly limited, and is preferably an oxidizing atmosphere. As the oxidizing atmosphere, preferably an oxygen-containing gas atmosphere may be used, and more preferably, for example, an atmosphere having an oxygen concentration of 18% by volume to 100% by volume may be used.

By setting the oxygen concentration in the atmosphere during firing to 18% by volume or more, the crystallinity of the lithium composite oxide can be particularly increased.

When the oxygen-containing gas atmosphere is used, examples of a gas contained in the atmosphere include air (atmosphere), oxygen, a mixed gas of oxygen and an inert gas, and the like. When, for example, a mixed gas of oxygen and an inert gas is used as the gas contained in the oxygen-containing gas atmosphere, it is preferable that the oxygen concentration in the mixed gas satisfy the above-described range. In particular, the firing process is preferably performed in a gas flow of an oxygen-containing gas, and more preferably in an air or oxygen flow. The firing process is preferably performed in an oxygen flow, particularly in view of battery characteristics.

A furnace used for firing is not particularly limited. For example, a furnace capable of firing a precursor filler for manufacturing the lithium composite oxide in an air or oxygen flow may be preferably used. From the viewpoint of maintaining a uniform atmosphere in the furnace, an electric furnace that does not generate gas is preferably used, and either a batch-type or continuous-type furnace may be used.

(Calcination Process)

In the present embodiment, the raw material mixture (lithium composite oxide precursor) obtained in the mixing process may be calcinated before the firing process. When calcination is performed, the temperature of calcination is not particularly limited, and may be lower than the temperature of firing in the firing process. The temperature of calcination is preferably, for example, 250° C. to 700° C., and more preferably 350° C. to 650° C.

The calcination time, that is, the time for maintaining at the calcination temperature described above, is preferably about 1 hour to 10 hours, and more preferably 3 hours to 6 hours, for example.

After calcination, the firing process may be performed after cooling. Alternatively, the firing process may be continuously performed by raising the temperature from the calcination temperature to the firing temperature.

The atmosphere during calcination is not particularly limited, and may be the same atmosphere as in the firing process, for example.

By performing the calcination, lithium is sufficiently diffused into the metal composite compound such as the nickel composite oxide, and a particularly uniform lithium composite oxide can be obtained.

[Lithium-Ion Secondary Battery]

Next, a lithium-ion secondary battery to which the positive-electrode active material is applied according to the present embodiment (hereinafter, also referred to as "secondary battery") will be described. The secondary battery according to the present embodiment has a positive electrode in which the above-described positive-electrode active material is used as a positive electrode material.

The secondary battery according to the present embodiment includes, for example, a positive electrode, a negative electrode, a separator, and a nonaqueous electrolyte, and is composed of substantially the same components as a common lithium-ion secondary battery. The embodiments described below are merely exemplary, and the secondary battery according to the present embodiment may be implemented in various modifications and improvements based on the knowledge of those skilled in the art, including the following embodiments. The application of the secondary battery is not particularly limited. Hereinafter, the secondary battery according to the present embodiment will be described for each component.

(Positive Electrode)

The positive electrode included in the secondary battery according to the present embodiment may include the positive-electrode active material described above.

An example of a method of manufacturing the positive electrode will be described. First, the positive-electrode active material (in powder form), a conductive material, and a binding agent (binder) are mixed to form a positive-electrode mixture. If necessary, activated carbon or a solvent for the purpose of adjusting the viscosity and the like may be added. The positive-electrode mixture is then kneaded to prepare a positive-electrode mixture paste.

The mixing ratio of each material in the positive-electrode mixture is the factor that determines the performance of the lithium secondary battery. The mixing ratio may be adjusted according to the application. The mixing ratio of the materials may be substantially the same as that of a publicly-known lithium secondary battery. For example, when the total mass of the solid content of the positive-electrode mixture, excluding the solvent, is 100% by mass, the positive-electrode mixture may include the positive-electrode active material in a ratio of 60% by mass to 95% by mass, the conductive material in a ratio of 1% by mass to 20% by mass, and the binding agent in a ratio of 1% by mass to 20% by mass.

By coating the obtained positive-electrode mixture paste to the surface of a current collector made of, for example, aluminum foil, and by drying the paste to evaporate the solvent, a sheet-like positive electrode is formed. In order to increase the electrode density, pressure may be applied using a roll press and the like, if necessary. The sheet-like positive electrode thus obtained may be cut into an appropriate size according to the desired battery, and used for producing the battery.

As the conductive material, for example, graphite (natural graphite, artificial graphite, expanded graphite, and the like), and carbon black-based materials such as acetylene black, Ketjenblack (registered trademark), and the like may be used.

The binding agent (binder) plays a role of binding the active material particles. For example, polyvinylidene fluoride (PVDF), polytetrafluoroethylene (PTFE), fluororubber, ethylene propylene diene rubber, styrene butadiene, cellulosic resin, polyacrylic acid, and the like may be used.

If necessary, a solvent for dispersing the positive-electrode active material, the conductive material, and the activated carbon, and for dissolving the binding agent is added to the positive-electrode mixture. As the solvent, specifically, an organic solvent such as N-methyl-2-pyrrolidone may be used. Activated carbon may also be added to the positive-electrode mixture in order to increase the capacity of the electric double layer.

The method of manufacturing the positive electrode is not limited to the example described above, and other methods may be used. For example, the positive-electrode mixture may be press-molded, and then dried under a vacuum atmosphere to manufacture the positive electrode.

(Negative Electrode)

As the negative electrode, a metallic lithium, a lithium alloy, and the like may be used. Also, the negative electrode formed as follows may be used. A negative-electrode active material capable of intercalating and de-intercalating of lithium ions is mixed with a binding agent. An appropriate solvent is added thereto, so that a paste-like negative-electrode mixture is obtained. The negative-electrode mixture is coated to the surface of a current collector made of metal foil such as copper, and dried. If necessary, compression is performed in order to increase the electrode density.

As the negative-electrode active material, for example, such as natural graphite, artificial graphite, a fired body of an organic compound such as phenol resin, a powder of a carbon material such as coke, and the like may be used. In this case, as the negative-electrode binding agent, similarly to the case of the positive electrode, a fluorine-containing resin such as PVDF may be used. As the solvent for dispersing the active material and the binding agent, an organic solvent such as N-methyl-2-pyrrolidone may be used.

(Separator)

A separator may be sandwiched between the positive electrode and the negative electrode, if necessary. The separator separates the positive electrode and the negative electrode from each other, and retains the electrolyte. As the separator, a publicly-known separator may be used. Such a separator may be a thin film of, for example, polyethylene or polypropylene having a large number of microscopic openings.

(Nonaqueous Electrolyte)

As the nonaqueous electrolyte, for example, a nonaqueous electrolyte solution may be used. As the nonaqueous electrolyte solution, for example, a solution in which a lithium salt as a supporting salt is dissolved in an organic solvent may be used. As the nonaqueous electrolyte solution, a solution in which a lithium salt is dissolved in an ionic liquid may be used. The ionic liquid refers to a salt that is composed of cations other than lithium ions and anions, and is in a liquid state at room temperature.

As the organic solvent, it is possible to use cyclic carbonates, such as ethylene carbonate, propylene carbonate, butylene carbonate, and trifluoropropylene carbonate; chain-like carbonates such as diethyl carbonate, dimethyl carbonate, ethylmethyl carbonate, and dipropyl carbonate; ether compounds such as tetrahydrofuran, 2-methyltetrahydrofuran, and dimethoxyethane; sulfur compounds such as ethylmethylsulfone and butane sultone; and phosphorus compounds such as triethyl phosphate and trioctyl phosphate. These substances may be used either alone or in mixtures of two or more.

As the supporting salt, it is possible to use $LiPF_6$, $LiBF_4$, $LiClO_4$, $LiAsF_6$, $LiN(CF_3SO_2)_2$, and a composite salt of these. The nonaqueous electrolyte solution may further include a radical scavenger, a surfactant, a flame retardant, and the like.

As the nonaqueous electrolyte, a solid electrolyte may be used. The solid electrolyte has the property to withstand high voltages. Examples of the solid electrolyte include an inorganic solid electrolyte and an organic solid electrolyte.

Examples of the inorganic solid electrolyte include an oxide solid electrolyte, a sulfide solid electrolyte, and the like.

The oxide solid electrolyte is not particularly limited. For example, it is preferable to use an oxide solid electrolyte that includes oxygen (O) and has both a lithium ion conductivity and an electron insulating property. As the oxide solid electrolyte, one or more substance selected from lithium phosphate ($Li_3PO_4$), $Li_3PO_4N_X$, $LiBO_2N_X$, $LiNbO_3$, $LiTaO_3$, $Li_2SiO_3$, $Li_4SiO_4$—$Li_3PO_4$, $Li_4SiO_4$—$Li_3VO_4$, $Li_2O$—$B_2O_3$—$P_2O_5$, $Li_2O$—$SiO_2$, $Li_2O$—$B_2O_3$—$ZnO$, $Li_{1+X}Al_XTi_{2-X}(PO_4)_3$ ($0 \leq X \leq 1$), $Li_{1+X}Al_XGe_{2-X}(PO_4)_3$ ($0 \leq X \leq 1$), $LiTi_2(PO_4)_3$, $Li_{3X}La_{2/3-X}TiO_3$ ($0 \leq X \leq 2/3$), $Li_7La_3Ta_2O_{12}$, $Li_7La_3Zr_2O_{12}$, $Li_6BaLa_2Ta_2O_{12}$, $Li_{3.6}Si_{0.6}P_{0.4}O_4$, and the like may be used.

The sulfide solid electrolyte is not particularly limited. For example, it is preferable to use a sulfide solid electrolyte that includes sulfur (S) and has both a lithium ion conductivity and an electron insulating property. As the sulfide solid electrolyte, one or more substances selected from $Li_2S$—$P_2S_5$, $Li_2S$—$SiS_2$, $LiI$—$Li_2S$—$SiS_2$, $LiI$—$Li_2S$—$P_2S_5$, $LiI$—$Li_2S$—$B_2S_3$, $Li_3PO_4$—$Li_2S$—$Si_2S$, $Li_3PO_4$—$Li_2S$—$SiS_2$, $LiPO_4$—$Li_2S$—$SiS$, $LiI$—$Li_2S$—$P_2O_5$, $LiI$—$Li_3PO_4$—$P_2S_5$, and the like may be used.

As the inorganic solid electrolyte, those other than the above may be used. For example, $Li_3N$, $LiI$, $Li_3N$—$LiI$—$LiOH$, and the like may be used.

The organic solid electrolyte is not particularly limited as long as it is a polymer compound exhibiting ion conductivity. For example, polyethylene oxide, polypropylene oxide, copolymers thereof, and the like may be used. The organic solid electrolyte may also include a supporting salt (lithium salt).

(Shape and Configuration of Secondary Battery)

The above-described lithium-ion secondary battery according to the present embodiment may be of various shapes, such as a cylindrical shape and a stacked shape. In any shape, when the secondary battery according to the present embodiment uses a nonaqueous electrolyte solution as a nonaqueous electrolyte, the configuration of the secondary battery may be as follows. The positive electrode and the negative electrode are stacked via the separator to form an electrode body, and the electrode body is impregnated with the nonaqueous electrolyte solution. By using leads for current collection, the positive-electrode current collector and a positive-electrode terminal leading to the outside are connected, and the negative-electrode current collector and a negative-electrode terminal leading to the outside are connected. Those are sealed in a battery case.

The secondary battery according to the present embodiment is not limited to using a nonaqueous electrolyte solution as the nonaqueous electrolyte. For example, a secondary battery using a solid nonaqueous electrolyte, that is, an all-solid-state battery, may be applied. In the case of the all-solid-state battery, the configuration other than the positive-electrode active material may be changed as necessary.

EXAMPLE

Hereinafter, the present invention will be described in further detail by way of examples and reference examples. The present invention is not limited to these examples.

A method of manufacturing the positive-electrode active material and the secondary battery used in the examples and the comparative examples and evaluation thereof will be described below.

Example 1

[Preparation of Positive-Electrode Active Material and Secondary Battery]
(1) Preparation of Nickel Composite Oxide
(Crystallizing Process)

First, a preliminary experiment was performed to examine the crystallizing conditions (pH, ammonia concentration, and the like of the reaction aqueous solution) in the crystallizing process so that the average pore size of the positive-electrode active material was 0.2 μm to 1.0 μm when the pore size was measured in the range of 0.0036 μm to 400 μm. The crystallizing condition was selected so that the average pore size is 0.00726 μm when measured in the range of 0.0036 μm to 400 μm. Nickel composite hydroxide particles including nickel, cobalt, and aluminum in an amount of substance ratio of Ni:Co:Al=92:5:3 were crystallized.

Then, the collected slurry containing the nickel composite hydroxide particles was filtered, washed off the water-soluble impurities with ion-exchanged water, and dried.

The particle size distribution of the obtained nickel composite hydroxide particles was measured using a laser diffraction scattering particle size analyzer (Microtrack HRA (trademark), manufactured by Nikkiso Co., Ltd.). The average particle size of the nickel composite hydroxide particles was 14.3 μm in the median size $D_{50}$.

(Oxidizing Roasting Process)

The obtained nickel composite hydroxide particles were roasted by oxidation at 500° C. for 5 hours in an air (oxygen concentration: 21% by volume) flow. Thus, particles (nickel cobalt composite oxide particles) of the nickel cobalt composite oxide ($Ni_{0.92}Co_{0.05}Al_{0.03}O$) in which nickel, cobalt, and aluminum form a solid solution in a mole ratio of 92:5:3 were obtained.

(2) Production of Positive-Electrode Active Material
(Mixing Process)

The obtained nickel cobalt composite oxide particles and lithium hydroxide, which is a lithium compound, were thoroughly mixed using a shaker mixer (manufactured by Willy A. Bachofen AG (WAB), TURBULA Type T2C), and a raw material mixture (lithium composite oxide precursor) was prepared. At this time, each raw material was weighed and mixed so that Li/Me, that is, the ratio of the number of atoms of lithium (Li) to metals other than lithium (Me) contained in the obtained lithium composite oxide precursor, was 1.05.

(Firing Process)

The lithium composite oxide precursor obtained in the mixing process was fired at 790° C. for 10 hours under an oxygen-containing atmosphere with 90% by volume of oxygen concentration and nitrogen in the balance. The obtained fired product was pulverized using a pin mill with a strength sufficient to maintain the particle shape.

By the above procedure, porous lithium composite oxide particles. (lithium composite oxide powder) were obtained.
(Washing and Drying Process)

To 100 parts by mass of the obtained lithium composite oxide particles, water was mixed at a ratio of 150 parts by mass. After stirring with water, suction filtration was performed using a Nutsche to obtain a sediment (washing process). The obtained sediment was placed in a container made of stainless steel (SUS), warmed to 100° C. using a vacuum dryer, further warmed at 190° C. for 12 hours. Then, after static drying for 10 hours, a positive-electrode active material (drying process) is obtained.

The composition and heterogenous phase of the obtained positive-electrode active material were examined. The positive-electrode active material obtained in the present experiment example was found to be composed of a lithium composite oxide represented by the general formula: $Li_{0.98}Ni_{0.92}Co_{0.05}Al_{0.03}O_2$. From the XRD pattern of the active material, heterogenous phase was not observed. The BET specific surface area of the positive-electrode active material was 1.2 $m^2$/g.

(3) Preparation of Secondary Battery

A coin battery having a structure shown in FIG. 1 was prepared according to the following procedure. As shown in FIG. 1, a coin battery 10 includes a case 11 and an electrode 12 contained within the case 11.

The case 11 includes a positive electrode can 111 which is hollow and one-end opened, and a negative electrode can 112 disposed in an opening of the positive electrode can 111. When the negative electrode can 112 is disposed in the opening of the positive electrode can 111, a space for accommodating the electrode 12 is formed between the negative electrode can 112 and the positive electrode can 111.

The electrode 12 includes a positive electrode 121, a separator 122, and a negative electrode 123. The positive electrode 121, the separator 122, and the negative electrode 123 are stacked in this order and are housed in the case 11 such that the positive electrode 121 contacts the inner surface of the positive electrode can 111, and the negative electrode 123 contacts the inner surface of the negative electrode can 112.

The case 11 includes a gasket 113. The gasket 113 regulates the relative movement of the positive electrode can 111 and the negative electrode can 112, and fixes the positive electrode can 111 and the negative electrode can 112. This enables the positive electrode can 111 and the negative electrode can 112 to be maintained in a non-contact state to each other, that is, an electrically insulated state. The gasket 113 also has a function of sealing the gap between the positive electrode can 111 and the negative electrode can 112 so as to make the interior and exterior of the case 11 air-tight and liquid-tight.

The coin battery 10 was manufactured as follows. First, 52.5 mg of the obtained positive-electrode active material, 15 mg of acetylene black, and 7.5 mg of polytetrafluoroethylene (PTFE) resin were mixed and pelletized to a weight of approximately 75 mg with a diameter of 11 mm to prepare the positive electrode 121. The positive electrode 121 was dried in a vacuum dryer at 100° C. for 12 hours.

The positive electrode 121, the negative electrode 123, the separator 122, and the electrolyte solution were used to produce the coin battery 10 in a glove box in an Ar atmosphere having a dew point controlled to −60° C.

As the negative electrode 123, lithium metal that is punched out into a disk of 13 mm diameter was used.

As the separator 122, a polyethylene porous film with a thickness of 25 μm was used.

As the electrolyte solution, a 1:1 mixture on a volume basis of ethylene carbonate (EC) and diethyl carbonate (DEC) with 1 mol/l $LiClO_4$ as supporting electrolyte (manufactured by Tomiyama pure chemical industries, Ltd.) was used.

[Evaluation of Positive-Electrode Active Material and Secondary Battery]
(1) Evaluation of Positive-Electrode Active Material The following evaluation was performed on the prepared positive-electrode active material.

(a) Average Pore Size

The average pore size (unit: μm) of the positive-electrode active material was measured using a mercury porosimeter (fully automatic pore size analyzer, PoreMaster (trademark) 60-GT). The average pore diameter was measured as the average pore size.

The average pore size (unit: μm) in the range of 0.0036 μm to 400 μm and the average pore size (unit: μm) in the range of 0.0036 μm to 0.5 μm of the positive-electrode active material were measured. Hereinafter, the cumulative specific surface area and the cumulative pore volume were also measured within the ranges of the average particle sizes.

(b) Cumulative Specific Surface Area

The cumulative specific surface area S1 and S2 (unit: m²/g) of the lithium composite oxide particles were measured by a flow-type gas adsorption method specific surface area measurement device (manufactured by Yuasa Ionics Co., Ltd., Multisorb).

(c) Cumulative Pore Volume

The cumulative pore volume (unit: cc/g) of the lithium composite oxide particles was measured using a fully automatic pore size analyzer (a mercury porosimeter (manufactured by Quantachrome Corporation, PoreMaster (trademark) 60-GT)).

(d) Proportion of Micropores

Based on the following formula (1), the ratio S2/S1 of the cumulative specific surface area S2 to the cumulative specific surface area S1 was calculated as the proportion of micropores.

proportion of micropores (%)=(cumulative specific surface area $S2$ with pore size ranging from 0.0036 μm to 0.5 μm)/(cumulative specific surface area $S1$ with pore size ranging from 0.0036 μm to 400 μm)×100 (1)

The evaluation results are shown in Tables 1 and 2. Table 1 shows the measurement results in which the pore size of the pore formed on the positive-electrode active material was measured in the range of 0.0036 μm to 400 μm. Table 2 shows the measurement results in which the pore size of the pore formed on the positive-electrode active material was measured in the range of 0.0036 μm to 0.5 μm and the result of the proportion of micropores.

(2) Evaluation of Battery Characteristics

The prepared coin battery shown in FIG. 1 was used to measure and evaluate charge capacity, initial discharge capacity, and charge and discharge efficiency, as battery characteristics.

(a) Charge Capacity, Initial Discharge Capacity, and Charge and Discharge Efficiency The prepared coin battery was left for about 12 hours from the preparation. After the open circuit voltage (OCV) was stabilized, charging was performed by setting the current density with respect to the positive electrode to 0.1 mA/cm². The capacity when charged to a cut-off voltage of 4.3 V was defined as the charge capacity.

After the charging and pausing for 1 hour, discharging was performed. The capacity when discharged to a cut-off voltage of 3.0 V was defined as the initial discharge capacity.

The charge and discharge efficiency, which is the ratio of the initial discharge capacity to the charge capacity, was calculated.

The evaluation results of charge capacity, discharge capacity, and charge and discharge efficiency of the prepared coin battery are shown in Table 3.

Example 2

The positive-electrode active material was prepared in the same manner as Example 1, except that the crystallizing condition in the crystallizing process based on the preliminary experiment was changed so that the average pore size was 0.306 μm. The average particle size of the nickel composite hydroxide particles was 14.2 μm in the median size $D_{50}$, and the BET specific surface area of the positive-electrode active material was 1.0 m²/g. The evaluation results of average pore size, cumulative specific surface area, and cumulative pore volume of the positive-electrode active material are shown in Table 1 and Table 2. In Table 2, proportion of micropores is shown. The evaluation results of the battery characteristics (charge capacity, initial discharge capacity, and charge and discharge efficiency) of the coin battery are shown in Table 3.

Example 3

The positive-electrode active material was prepared in the same manner as Example 1, except that the crystallizing condition in the crystallizing process based on the preliminary experiment was changed so that the mole ratio of nickel, cobalt, and aluminum was 87:5:8, and the average pore size was 0.415 μm. The average particle size of the nickel composite hydroxide particles was 10.9 μm in the median size $D_{50}$, and the BET specific surface area of the positive-electrode active material was 1.1 m²/g. The evaluation results of average pore size, cumulative specific surface area, and cumulative pore volume of the positive-electrode active material are shown in Table 1 and Table 2. In Table 2, proportion of micropores is shown. The evaluation results of the battery characteristics (charge capacity, initial discharge capacity, and charge and discharge efficiency) of the coin battery are shown in Table 3.

Comparative Example 1

The positive-electrode active material was prepared in the same manner as Example 1, except that the crystallizing condition in the crystallizing process based on the preliminary experiment was changed so that the average pore size was 0.198 μm. The average particle size of the nickel composite hydroxide particles was 14.1 μm in the median size $D_{50}$, and the BET specific surface area of the positive-electrode active material was 0.7 m²/g. The evaluation results of average pore size, cumulative specific surface area, and cumulative pore volume of the positive-electrode active material are shown in Table 1 and Table 2. In Table 2, proportion of micropores is shown. The evaluation results of the battery characteristics (charge capacity, initial discharge capacity, and charge and discharge efficiency) of the coin battery are shown in Table 3.

Comparative Example 2

The positive-electrode active material was prepared in the same manner as Example 1, except that the crystallizing condition in the crystallizing process based on the preliminary experiment was changed so that the average pore size was 0.127 μm. The average particle size of the nickel composite hydroxide particles was 14.5 μm in the median size $D_{50}$, and the BET specific surface area of the positive-electrode active material was 0.8 m²/g. The evaluation results of average pore size, cumulative specific surface area, and cumulative pore volume of the positive-electrode active material are shown in Table 1 and Table 2. In Table 2, proportion of micropores is shown. The evaluation results of the battery characteristics (charge capacity, initial discharge capacity, and charge and discharge efficiency) of the coin battery are shown in Table 3.

Comparative Example 3

The positive-electrode active material was prepared in the same manner as Example 3, except that the crystallizing condition in the crystallizing process based on the preliminary experiment was changed so that the average pore size was 0.168 μm. The average particle size of the nickel composite hydroxide particles was 10.9 μm in the median size $D_{50}$, and the BET specific surface area of the positive-electrode active material was 0.8 m²/g. The evaluation results of average pore size, cumulative specific surface area, and cumulative pore volume of the positive-electrode active material are shown in Table 1 and Table 2. In Table 2, proportion of micropores is shown. The evaluation results of the battery characteristics (charge capacity, initial discharge capacity, and charge and discharge efficiency) of the coin battery are shown in Table 3.

TABLE 3-continued

| | COIN BATTERY | | |
|---|---|---|---|
| | INITIAL DISCHARGE CAPACITY [mAh/g] | CHARGE CAPACITY [mAh/g] | CHARGE/ DISCHARGE EFFICIENCY [%] |
| EXAMPLE 3 | 208.8 | 231.3 | 90.3 |
| COMPARATIVE EXAMPLE 1 | 205.5 | 236.0 | 87.1 |
| COMPARATIVE EXAMPLE 2 | 209.0 | 236.9 | 88.2 |
| COMPARATIVE EXAMPLE 3 | 203.1 | 229.6 | 88.5 |

From Table 1 and Table 2, in the positive-electrode active material of Examples 1 to 3, the average pore sizes were 0.306 μm to 0.530 μm when the pore size was measured in the range of 0.0036 μm to 400 μm. From Table 3, in the

TABLE 1

| | NICKEL COMPOSITE HYDROXIDE AVERAGE PARTICLE SIZE ($D_{50}$) [μm] | POSITIVE-ELECTRODE ACTIVE MATERIAL | | | |
|---|---|---|---|---|---|
| | | RANGE OF PARTICLE SIZE MEASURED [μm] | AVERAGE PORE SIZE [μm] | CUMULATIVE SPECIFIC SURFACE AREA S1 [m²/g] | CUMULATIVE PORE VOLUME [cc/g] |
| EXAMPLE 1 | 14.3 | 0.0036~400 | 0.530 | 1.48 | 0.196 |
| EXAMPLE 2 | 14.2 | 0.0036~400 | 0.306 | 2.50 | 0.192 |
| EXAMPLE 3 | 10.9 | 0.0036~400 | 0.415 | 1.92 | 0.193 |
| COMPARATIVE EXAMPLE 1 | 14.1 | 0.0036~400 | 0.198 | 3.98 | 0.197 |
| COMPARATIVE EXAMPLE 2 | 14.5 | 0.0036~400 | 0.127 | 6.05 | 0.192 |
| COMPARATIVE EXAMPLE 3 | 10.9 | 0.0036~400 | 0.168 | 4.58 | 0.194 |

TABLE 2

| | NICKEL COMPOSITE HYDROXIDE AVERAGE PARTICLE SIZE ($D_{50}$) [μm] | POSITIVE-ELECTRODE ACTIVE MATERIAL | | | | |
|---|---|---|---|---|---|---|
| | | RANGE OF PARTICLE SIZE MEASURED [μm] | AVERAGE PORE SIZE [μm] | CUMULATIVE SPECIFIC SURFACE AREA S2 [m²/g] | CUMULATIVE PORE VOLUME [cc/g] | PROPORTION OF MICROPORE S2/S1 [%] |
| EXAMPLE 1 | 14.3 | 0.0036~0.5 | 0.00726 | 1.24 | 0.0023 | 83.8 |
| EXAMPLE 2 | 14.2 | 0.0036~0.5 | 0.01330 | 2.27 | 0.0076 | 90.8 |
| EXAMPLE 3 | 10.9 | 0.0036~0.5 | 0.00892 | 1.65 | 0.0055 | 85.9 |
| COMPARATIVE EXAMPLE 1 | 14.1 | 0.0036~0.5 | 0.00606 | 3.75 | 0.0057 | 94.2 |
| COMPARATIVE EXAMPLE 2 | 14.5 | 0.0036~0.5 | 0.00898 | 5.83 | 0.0131 | 96.4 |
| COMPARATIVE EXAMPLE 3 | 10.9 | 0.0036~0.5 | 0.00757 | 4.28 | 0.0102 | 93.4 |

TABLE 3

| | COIN BATTERY | | |
|---|---|---|---|
| | INITIAL DISCHARGE CAPACITY [mAh/g] | CHARGE CAPACITY [mAh/g] | CHARGE/ DISCHARGE EFFICIENCY [%] |
| EXAMPLE 1 | 218.2 | 240.5 | 90.7 |
| EXAMPLE 2 | 213.5 | 238.2 | 89.6 | lithium-ion secondary battery prepared using any of the positive-electrode active materials, the charge and discharge efficiency was 89.5% or more.

In contrast, from Table 1 and Table 2, in the positive-electrode active material of Comparative Examples 1 to 3, the average pore sizes were less than 0.2 μm when the pore size was measured in the range of 0.0036 μm to 400 μm. From Table 3, in the lithium-ion secondary battery prepared using any of the positive-electrode active materials, the charge and discharge efficiency was about 88.5% or less.

From Table 3, when comparing Example 1 and Example 2 with Comparative Example 1 and Comparative Example 0.2 having the same composition, the initial discharge capacity and the charge capacity were larger in Example 1 and Example 2 than in Comparative Example 1 and Comparative Example 2. Similarly, when comparing Example 3 with Comparative Example 3 having the same composition, the initial discharge capacity and the charge capacity were larger in Example 3 than in Comparative Example 3.

Therefore, it was confirmed that, when the average pore size is 0.306 μm to 0.530 μm when the pore size of the positive-electrode active material is measured in the range of 0.0036 μm to 400 μm, the charge amount, the initial discharge amount, and the charge and discharge efficiency of the lithium-ion secondary battery can be increased, and the battery characteristics of the lithium-ion secondary battery can be increased.

From Table 2, the ratios of the cumulative specific surface area S2/S1 of the positive-electrode active material of Examples 1 to 3 were 91% or less. In contrast, the ratios of the cumulative specific surface area S2/S1 of the positive-electrode active material of Comparative Examples 1 to 3 were 93% or more. Therefore, it can be said that, when the ratio of the cumulative specific surface area S2/S1 of the positive-electrode active material is 91% or less, the battery characteristics of the lithium-ion secondary battery can be improved.

The present application claims priority to Japanese Patent Application No. 2019-168510, filed Sep. 17, 2019, with the Japanese Patent Office. The contents of which are incorporated herein by reference in their entirety.

DESCRIPTION OF THE REFERENCE NUMERAL

10 coin battery
11 case
12 electrode
121 positive electrode
122 separator
123 negative electrode

The invention claimed is:

1. A positive-electrode active material for a lithium-ion secondary battery, wherein
an average pore size of the positive-electrode active material is 0.2 μm to 1.0 μm when a pore size is measured in a range of 0.0036 μm to 400 μm and
when a ratio S2/S1 of a cumulative specific surface area S2 measured in a range of the pore size of 0.0036 μm to 0.5 μm to a cumulative specific surface area S1 measured in the range of the pore size of 0.0036 μm to 400 μm is set as a proportion of micropores, the proportion of micropores is 70% to 92%.

2. A lithium-ion secondary battery comprising the positive-electrode active material according to claim 1.

* * * * *